United States Patent
Giezendanner et al.

[11] Patent Number: 5,919,545
[45] Date of Patent: Jul. 6, 1999

[54] COMPOSITE PANEL

[75] Inventors: Hansruedi Giezendanner, Neuhausen; Peter Müller, Thayngen; Johannes Meier, Basadingen, all of Switzerland

[73] Assignee: Alusuisse Technology & Management Ltd., Neuhausen am Rheinfall, Switzerland

[21] Appl. No.: 08/881,160

[22] Filed: Jun. 24, 1997

[30] Foreign Application Priority Data

Jul. 18, 1996 [EP] European Pat. Off. ............ 96810472

[51] Int. Cl.⁶ ........................................ B32B 3/12
[52] U.S. Cl. ........................ 428/116; 156/196; 156/197
[58] Field of Search .................. 428/116, 118, 428/117; 156/196, 197

[56] References Cited

U.S. PATENT DOCUMENTS

| | | | |
|---|---|---|---|
| 3,196,533 | 7/1965 | Ida et al. | 428/116 X |
| 3,890,108 | 6/1975 | Welsh | 428/116 X |
| 4,468,431 | 8/1984 | Okey | 428/317.7 |
| 4,917,747 | 4/1990 | Chin et al. | 428/116 X |

FOREIGN PATENT DOCUMENTS

| | | |
|---|---|---|
| 0 423 073B1 | 3/1995 | European Pat. Off. . |
| 2688971 | 9/1993 | France . |
| 2551753 | 5/1977 | Germany . |
| 3831363 A1 | 3/1990 | Germany . |

OTHER PUBLICATIONS

PCT WO–8806970.
PCT WO–9607492.
Japanese Abstracts, vol. 14, No. 407 M–1019 Sep. 4, 1990.
Japanese Abstracts, vol. 15, No. 17–C–0796 Jan. 14, 1991.
Japanese Abstracts, vol. 15, No. 174–M–1109 May 2, 1991.

*Primary Examiner*—Henry F. Epstein
*Attorney, Agent, or Firm*—Fisher, Christen & Sabol

[57] ABSTRACT

A composite panel comprising a core (12) and at least one outer sheet (14) which is adhesively bonded to the core is such that the composite panel (10) is shape-formed creating at least one radius of bending (24b) in the outer layer (14). The core (12) has a cellular structure and is bonded to the outer layer (14) at least by one visco-elastic adhesive layer (16) applied over the entire inner surface of the outer layer (14). The combination of the honeycomb structure of the core and the adhesive layer with the mentioned properties attaching the core to the outer sheet leads to a composite panel that may be shaped quickly and at favorable cost, without the outer layers being damaged or the stength being significantly reduced. As a result of the large area visco-elastic bonding a higher resistance to delamination, debonding due to vibration, corrosion and moisture is achieved.

11 Claims, 1 Drawing Sheet

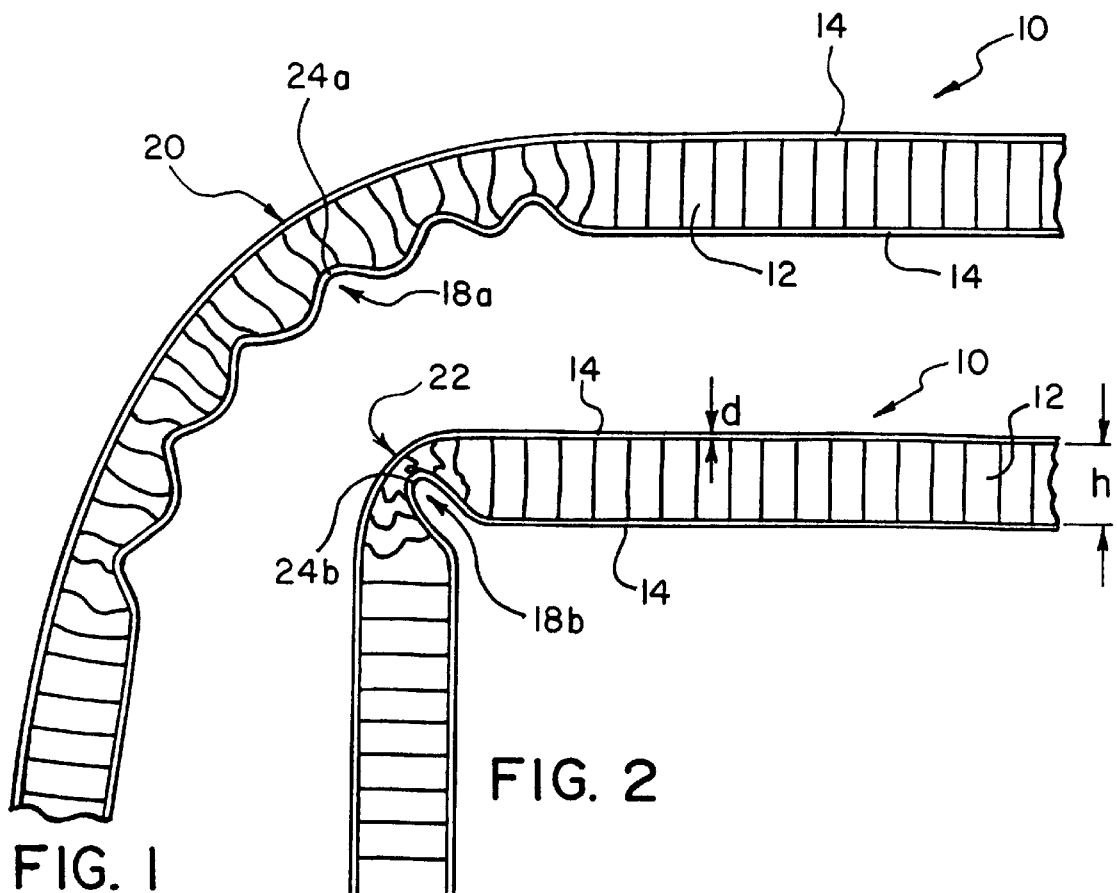
FIG. 1
FIG. 2
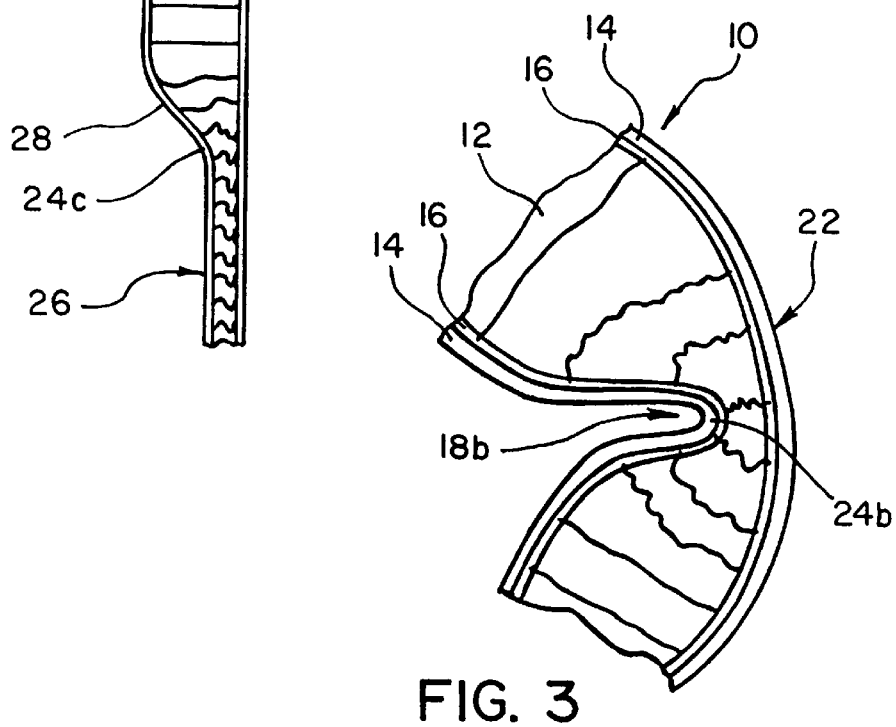
FIG. 3

COMPOSITE PANEL

BACKGROUND OF THE INVENTION

1. Field of the Invention

The invention relates to a composite panel comprising a core and at least one outer sheet which is adhesively bonded to the core, said composite panel being shape-formed creating at least one radius of bending in the outer layer.

2. Background Art

Composite panels that have a core of plastic and metallic outer layers and are shaped by bending are known from EP-B-0423073 and DE-A-3831363. The bending operation is performed after notching or embossing the outer sheet lying on the inner side of the bend. Depending on the degree of bending the radii of bending are greater or smaller along the notched or embossed line. Small radii may lead to separation of the adhesive provided between core and outer layers, which has a negative effect especially on corrosion resistance, firmness and fatigue strength.

As a rule curved composite panels are produced using expensive positive and negative dies and complicated bonding methods. As special dies have to be made for each shape, this method of manufacture involves high manufacturing costs. If the bending radius is small, it may be necessary to machine away the inner face of the outer layer, which is closed off again on bending. As this causes local disruption of the outer layer, there is a very large loss of strength in the region where such panels have been bent; this loss of strength has to be restored by appropriate means such as e.g. strengthening of the corners.

BROAD DESCRIPTION OF THE INVENTION

In view of this current state of the art, the object of the present invention is to provide a composite panel of the kind mentioned at the start which, starting from a flat composite panel, enables such panels over a wide range of thickness to be shape formed to any desired shape with any desired radius in a simple and cost favorable manner, this without using expensive dies, and namely such that, even when the radii are extremely small, the outer layer does not delaminate from the core layer.

That objective is achieved by way of the invention in that the core exhibits a cellular structure and is bonded to the outer layer at least by one visco-elastic adhesive layer applied over the entire inner surface of the outer layer.

By use of large area, visco-elastic bonding of the core to the outer layer a high resistance to delamination, slackening due to vibration, corrosion and moisture is achieved. As a result of its elastic behavior, the adhesive according to the invention yields to all deformation applied to the outer sheet, even when the radii are extremely small, this without the outer sheet delaminating from the core or the adhesive, or without the adhesive layer tearing. The high resistance of the honeycomb core to compressive forces leads to a uniform curvature in the region of bending.

A preferred composite panel is in the form of a so-called sandwich panel i.e. the core is clad on both sides with an outer layer.

The mechanical properties of aluminium and aluminium alloys make these materials particularly suitable for the core and outer layers.

The total thickness of the composite panels according to the invention may vary within wide limits. The core exhibits a preferred cell height of about 5 to 50 mm, in particular about 6 to 25 mm, and the thickness of the outer layers preferably lies between about 0.3 and 2 mm, in particular between about 0.5 and 1.5 mm.

In many cases the composite panel according to the invention enables simple shape forming to be carried out in one single step without the need for heating. The use of aluminium honeycomb cores results in only slight springback, which means that components can be made with close tolerances.

Among the rapid, cost favorable shape-forming operations that may be used with the composite panel according to the invention without great loss of strength are in particular folding, stamping (edges, holes, grooves) bending in a series of steps and curved bending.

The elasticity of the adhesive layer is preferably modified to provide resistance to tearing and delamination required of the bending radius i.e. the elasticity is adapted to accommodate the smallest bending radius. A degree of elasticity beyond this required level is, if possible, to be avoided as there is then an increasing negative effect on properties required of the product, such as adhesion and shear strength. Adhesives that may be employed are commercially available products such as polyolefins e.g. polyethylene or polypropylene. The composition of the adhesive employed is however not limited to the examples mentioned above.

The great advantage of the composite panel according to the invention is that it can be manufactured from a flat panel as starting material. It is therefore possible and also useful to manufacture the panel continuously in a known manner.

The composite panels according to the invention have a wide range of possible applications, especially as components in road and railway vehicles, in the building industry, for display stands at trade fairs or all kinds of cladding.

BRIEF DESCRIPTION OF THE DRAWINGS

Further advantages, features and details of the invention are explained in the following with the aid of preferred exemplified embodiments and the drawing which shows schematically in FIG. 1 a cross-section through a composite panel that has been bent in a series of steps;

FIG. 2 a cross-section through a composite panel that has been bent by folding and features a compressed edge region; and FIG. 3 an enlargement of part of FIG. 2.

DETAILED DESCRIPTION OF THE INVENTION

A composite panel 10 shown in FIGS. 1 and 2 exhibits a honeycomb core 12, e.g. of aluminium, of height h equal e.g. to 15 mm. The honeycomb core 12 is clad on both sides with an outer sheet e.g. of the aluminium alloy $AlMg_3$. The thickness of the outer sheet is e.g. 0.8 mm. The outer layer or sheet 14 and the honeycomb core 12 are joined by a visco-elastic adhesive layer 16 applied to the whole surface region—for reasons of clarity omitted in FIGS. 1 and 2.

The composite panel 10 in FIG. 1 exhibits a curvature which has been created by successive bending operations. To that end, successive indentations 18a were created in the outer sheet 14 on the inner lying side of the curved region. The individual indentations 18a lead to relatively small bending radii 24a.

The composite panel 10 in FIG. 2 has been bent around an edge 22 of 90° by a folding operation. As a result of folding, one single depression 18b of extremely small radius 24b has been formed. A further possible form of shaping viz., a compressed edge 26 is also shown in FIG. 2. A pronounced radius of curvature 24c may also form at the transition 28 from composite panel 10 to the compressed edge 26.

The high resistance of the honeycomb core 12 to compressive forces and the elasticity of the adhesive layer 16 lead to a uniform curvature 20 or edge 22 without delamination. The uniformity of curvature also results in an inner side which satisfies decorative requirements.

The results obtained in the region of small bending radii are obvious from FIG. 3 which is an enlarged view of the bent region shown in FIG. 2. From FIG. 3 it is evident that the large area application (i.e., the entire surface) of viscoelastic adhesive 16 is effective in preventing the outer layer 14 from freeing itself from the honeycomb core 12.

In order to increase the stability or strength of the shaped panel, the outer layer 14 may be reinforced by bonding an angle piece to the bent or folded area and/or filling the depressions 18a,b created by the forming operation. As a result of the elasticity of the adhesive the struts of the honeycomb core remain attached to the outer layer.

No high stresses producing a notching effect occur at the transition adhesive/honeycomb core interface i.e. the honeycomb core may deform plastically without danger of fracturing.

We claim:

1. A composite panel comprising a core (12) and at least one outer layer (14) which is adhesively bonded to the core and where the composite panel (10) is shape-formed creating at least one radius of bending (24a,b) in the outer layer, characterized in that the core (12) has a cellular structure and is bonded to the outer layer (14) at least by one visco-elastic adhesive layer (16) applied over the entire inner surface of the outer layer (14).

2. The composite panel according to claim 1, wherein in that the core (12) is arranged between two outer layers (14).

3. The composite panel according to claim 2, wherein the core (12) has a honeycomb structure and the core (12) and the outer layers (14) are composed of aluminum or an aluminum alloy.

4. The composite panel according to claim 3 wherein the core (12) has a cell height (h) of 5 to 50 mm and the thickness (d) of the outer layers (14) lies between 0.3 and 2 mm.

5. The composite panel according to claim 4 wherein the elasticity of the adhesive layer (16) is adapted to the resistance to tearing and delamination required for the bending radius (24a,b).

6. The composite panel according to claim 5 wherein in the region of bending or folding the outer layer (14) is reinforced by bonding an angle piece adhesively in that region and/or filling the depressions (18a,b) created by the forming operation.

7. The composite panel according to claim 3 wherein the core (12) has a cell height (h) of 6 to 25 mm, and the thickness (d) of the outer layers (14) lies between 0.5 and 1.5 mm.

8. The composite panel according to claim 1 wherein the core (12) has a honeycomb structure and the core (12) and the outer layers (14) are composed of aluminum or an aluminum alloy.

9. The composite panel according to claim 1, wherein the core (12) has a cell height (h) of 5 to 50 mm, and the thickness (d) of the outer layers (14) lies between 0.3 to 2 mm.

10. The composite panel according to claim 1, wherein the elasticity of the adhesive layer (16) is adapted to the resistance to tearing and delamination required for the bending radius (24a,b).

11. The composite panel according to claim 1, wherein the region of bending or folding the outer layer (14) is reinforced by bonding an angle piece adhesively in that region and for filling the depressions (18a,b) created by the forming operation.

* * * * *